(12) United States Patent
Hayashi et al.

(10) Patent No.: US 8,545,102 B2
(45) Date of Patent: Oct. 1, 2013

(54) SLIDING BEARING AND METHOD OF MANUFACTURING THE SAME

(75) Inventors: Motoshi Hayashi, Toyota (JP); Masahiro Kawahara, Toyota (JP); Ken-ichirou Futamura, Toyota (JP); Toshiaki Inaguma, Toyota (JP); Makoto Shibata, Toyota (JP)

(73) Assignee: Taiho Kogyo Co., Ltd., Toyota-shi, Aichi (JP)

( * ) Notice: Subject to any disclaimer, the term of this patent is extended or adjusted under 35 U.S.C. 154(b) by 280 days.

(21) Appl. No.: 12/737,946

(22) PCT Filed: Sep. 8, 2009

(86) PCT No.: PCT/JP2009/065654
§ 371 (c)(1),
(2), (4) Date: Mar. 2, 2011

(87) PCT Pub. No.: WO2010/038588
PCT Pub. Date: Apr. 8, 2010

(65) Prior Publication Data
US 2011/0164840 A1    Jul. 7, 2011

(30) Foreign Application Priority Data
Oct. 3, 2008    (JP) .................................. 2008-258895

(51) Int. Cl.
*F16C 23/04*    (2006.01)

(52) U.S. Cl.
USPC ........ 384/192; 384/276; 384/297; 29/898.043

(58) Field of Classification Search
USPC .................... 384/192, 276, 297; 29/898.043, 29/898.047, 898.054, 898.056, 898.058, 29/898.059
See application file for complete search history.

(56) References Cited

U.S. PATENT DOCUMENTS

| 4,896,368 | A | * | 1/1990 | Just ............................... 384/276 |
| 4,995,735 | A | * | 2/1991 | Dansdill ....................... 384/276 |
| 6,669,371 | B2 | * | 12/2003 | Tanaka et al. ................ 384/279 |
| 2007/0092173 | A1 | * | 4/2007 | Tsuji et al. .................... 384/276 |

FOREIGN PATENT DOCUMENTS

| JP | 55-019455 | 2/1980 |
| JP | 02-026313 | 1/1990 |
| JP | 05-208237 | 8/1993 |
| JP | 07-279967 | 10/1995 |
| JP | 2002-266848 | 9/2002 |
| JP | 2004-011898 | 1/2004 |
| JP | 2005-265043 | 9/2005 |
| JP | 2006-125516 | 5/2006 |
| WO | WO 9412800 A1 * | 6/1994 |

* cited by examiner

*Primary Examiner* — Thomas R Hannon
(74) *Attorney, Agent, or Firm* — Flynn, Thiel, Boutell & Tanis, P.C.

(57) ABSTRACT

A cylindrical sliding bearing 1 can rotatably support a rotational shaft by a sliding surface 4 (inner circumferential surface). A crowning 5 having a sloped surface is formed at both ends of the sliding surface 4 in the axial direction. The crowning 5 includes a first crowning 3A formed of a sloped surface of a lining layer 3 and a second crowning 2A formed of a sloped surface of a back metal 2 positioned on the lower side of the first crowning. Unlike a conventional sliding bearing, the back metal 2 where the crowning 5 is positioned is provided as a sloped surface (2A). As compared with conventional bearings, the crowning 5 can be prevented from being unevenly brought into contact with the rotational shaft.

10 Claims, 5 Drawing Sheets

(a)

(b)

SLIDING BEARING AND METHOD OF MANUFACTURING THE SAME

TECHNICAL FIELD

The present invention relates to a sliding bearing and a method of manufacturing the same. More particularly, the present invention relates to a sliding bearing having a crowning (sloped surface) on axial ends of a sliding surface and a method of manufacturing the same.

BACKGROUND ART

Conventionally, a sliding bearing having a crowning formed of a sloped surface on axial ends of a sliding surface has been suggested (Patent Literature 1, Patent Literature 2).

The sliding bearing having such a crowning is prevented from strongly coming into partial contact with a rotational shaft, and is therefore prevented from abnormal wear or seizure even when the rotational shaft serving as a partner material is supported and is slightly inclined, deflected, or swung during rotation. Thus, the sliding bearing can support the rotational shaft smoothly as a whole.

PRIOR ART DOCUMENTS

Patent Literature

Patent Literature 1: Japanese Patent Laid-Open No. 7-279967
Patent Literature 2: Japanese Patent Laid-Open No. 2002-266848

SUMMARY OF INVENTION

Problems to be Solved by the Invention

However, the conventional sliding bearing having the crowning as described above has the following problems.

When the rotational shaft supported by the sliding bearing is inclined, deflected, or swung more than expected, an outer circumferential part of the rotational shaft is strongly brought into contact with the crownings (both axial ends) of the sliding surface of the sliding bearing during the sliding. Since the conventional crownings are formed only on a lining layer, portions of the lining layer where the crownings are formed are thin. Accordingly, the crownings formed on the sliding bearing (both ends of the sliding surface) become worn quickly and a back metal is exposed, leading to damages such as seizure and metal fatigue.

The commonly-used conventional sliding bearing has a multiple structure in which a lining layer such as a bearing alloy layer and a resin layer is provided on a surface of the back metal. Therefore, portions of the lining layer where the crownings are formed are thin. When the crownings become worn quickly, the portions of the lining layer may be worn and the back metal may be unfavorably exposed.

Means for Solving the Problems

In view of the above-described circumstances, the present invention is directed to a sliding bearing including a cylindrical member or obtained by combining two semicylindrical members to be cylindrical, comprising the cylindrical member or the semicylindrical members including a back metal and a lining layer provided to cover an inner circumferential surface of the back metal so that the lining layer serves as a sliding surface, and includes a crowning formed of a sloped surface having a diameter gradually increasing toward an end surface from a center portion in an axial direction on at least one of both axial ends of the sliding surface, wherein the crowning includes a first crowning formed of a sloped surface formed on the lining layer and a second crowning formed of a sloped surface formed on a portion of the back metal which corresponds to the first crowning.

The present invention is also directed to a method of manufacturing the sliding bearing comprising: forming a sloped surface that is gradually thinner from a center portion toward a side portion in a width direction on at least one of both sides of a plate-shaped material by vertically pressing at least one of the sides of the plate-shaped material including a back metal and a lining layer covering a surface of the back metal using a molding roll; cutting the plate-shaped material to have a predetermined length; and shaping the plate-shaped material that is cut to have the predetermined length to be cylindrical or semicylindrical as a whole so that the lining layer serves as an inner circumferential surface and the sloped surface is positioned on one end of the inner circumferential surface in an axial direction.

The present invention is further directed to a method of manufacturing the sliding bearing comprising: forming a sloped surface that is gradually thinner from a center portion toward a side portion in a width direction by cutting a plate-shaped material including a back metal and a lining layer covering a surface of the back metal to have a predetermined length and pressing at least one of both sides of the material using a mold; and shaping the plate-shaped material that is cut to have the predetermined length to be cylindrical or semicylindrical as a whole so that the lining layer serves as an inner circumferential surface and the sloped surface is positioned on one end of the inner circumferential surface in an axial direction.

Further, the present invention is directed to a method of manufacturing the sliding bearing comprising: cutting a plate-shaped material including a back metal and a lining layer covering a surface of the back metal to have a predetermined length; and shaping the plate-shaped material that is cut to have the predetermined length to be cylindrical or semicylindrical as a whole so that the lining layer serves as an inner circumferential surface and forming a sloped surface having a diameter increasing from a center portion toward an end surface in an axial direction on at least one of both ends of the inner circumferential surface in the axial direction.

Advantageous Effects of Invention

With the above-described arrangement, the lining layer serving as the crowning of the sliding bearing (first crowning) and the back metal (second crowning) are gradually thinner toward end surfaces, and therefore the lining layer does not need to bear all of the crownings. Thus, the crownings can be prevented from rapid abnormal wear, seizure, and fatigue.

Also, in the sliding bearing with the above-described arrangement, the lining layer serving as the first crowning can be thicker than a conventional sliding bearing and therefore the elasticity of the crownings as a whole can be enhanced. Accordingly, the compatibility for supporting the rotational shaft serving as a partner material becomes favorable. Consequently, a sliding bearing having a longer life as compared with the conventional sliding bearing can be provided.

BRIEF DESCRIPTION OF DRAWINGS

FIG. 5(a) shows the side of the material 11 before the rolling step, and FIG. 5(b) shows the side of the material 11 after the rolling step.

MODE FOR CARRYING OUT THE INVENTION

Figure 1:
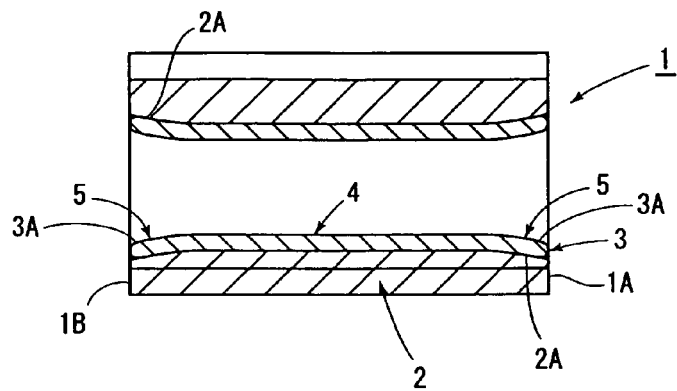
FIG. 1 is a sectional view showing an embodiment of the present invention.

The illustrated embodiments of the present invention will be described below. In FIG. 1, reference numeral 1 denotes a sliding bearing. The sliding bearing 1 is formed to be cylindrical as a whole. The sliding bearing 1 includes a cylindrical back metal 2 and a lining layer 3 provided to cover an entire inner circumferential surface of the back metal 2. A surface of the lining layer 3 in the sliding bearing 1 serves as a sliding surface 4 that slides with a rotational shaft (not shown). The rotational shaft is rotatably supported by the lining layer 3 serving as the sliding surface 4. The back metal 2 is made of a steel such as SPCC. As the lining layer 3, a bearing alloy layer, a resin layer, or a combination of the bearing alloy layer and the resin layer covering the surface of the bearing alloy layer can be used. A sintered alloy layer and a resin layer covering the surface of the sintered alloy layer can also be used.

Figure 2:
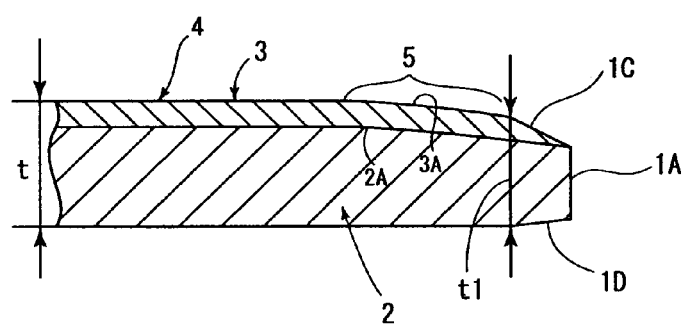
FIG. 2 is an enlarged view showing a main part of FIG. 1.
Figure 3:
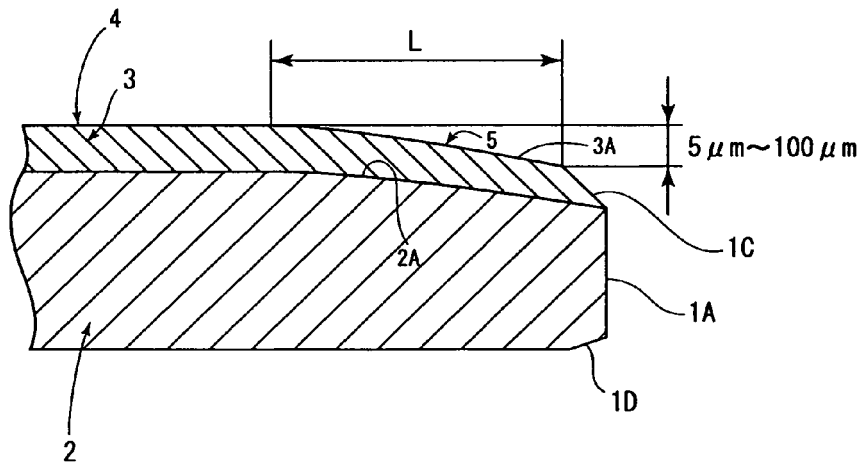
FIG. 3 is an enlarged view showing a main part of FIG. 2.

The sliding bearing 1 includes crownings 5 and 5 which are formed of sloped surfaces at both ends of the sliding surface 4 in the axial direction. Each of the crownings 5 and 5 includes the sloped surface (tapered surface) having a diameter increasing toward an end surface 1A, 1B from the axial center of the sliding surface 4. As shown in FIGS. 2 and 3, a chamfered portion 1C is formed on the boundary between an inner circumferential edge of the end surface 1A (1B) of the sliding bearing 1 and the crowning 5, and a chamfered portion 1D is formed on an outer circumferential edge of the end surface 1A (1B) (an outer circumferential edge of the back metal 2).

The crowning 5 of the embodiment includes a first crowning 3A which is formed on the lining layer 3 and is formed as a sloped surface having a diameter increasing toward the end surface 1A (1B), and a second crowning 2A which is formed on the back metal 2 to overlap the first crowning 3A and is formed as a sloped surface having a diameter increasing toward the end surface 1A (1B).

The thickness of the lining layer 3 as a whole is approximately uniform, but the first crowning 3A is slightly thinner than the center portion in the axial direction (a portion with no taper). Also, the second crowning 2A (the back metal 2 provided to form the crowning 5) is gradually thinner toward the end surface 1A (1B) from the center portion in the axial direction.

In other words, in the embodiment, the entire crowning 5 is formed as the sloped surface having a diameter increasing toward the end surface 1A (1B) from the center portion in the axial direction because the back metal 2 forming the second crowning 2A is provided as the sloped surface having a diameter increasing toward the end surface 1A (1B) from the center portion in the axial direction.

As shown in FIGS. 2 and 3 in an enlarged manner, an axial dimension L of the crowning 5 on one end (right end) is set to be approximately 5 to 15% of an axial dimension of the sliding bearing 1. In other words, the total axial dimension of both crownings 5 and 5 is set to be 10 to 30% of the axial dimension of the sliding bearing 1. Further, in the embodiment, the maximum dimension of the diameter of the crowning 5 which increases from the center portion of the sliding surface 4 toward the outer side in the radial direction, i.e., a diametrical expansion quantity of the crowning 5 in the radial direction, is set to be 5 to 100 μm. Incidentally, the crowning 5 on the other end in the axial direction (the left side in FIG. 1) is set to have the same dimension as the crowning 5 on the one end as described above.

As described later, the sliding bearing 1 of the embodiment is formed to be cylindrical as a whole after the sloped surface serving as the crowning 5 is formed by pressing both sides of the plate-shaped material 11 using molding rolls 12. Accordingly, in the sliding bearing 1 of the embodiment, the surface roughness of the crowning 5 is small compared to the center portion of the sliding surface 4 in the axial direction. Thus, the friction at the crowning 5 is smaller than that at the center portion of the sliding surface 4 in the axial direction, so that an increase in friction due to nonuniform contact can be prevented.

Figure 4:
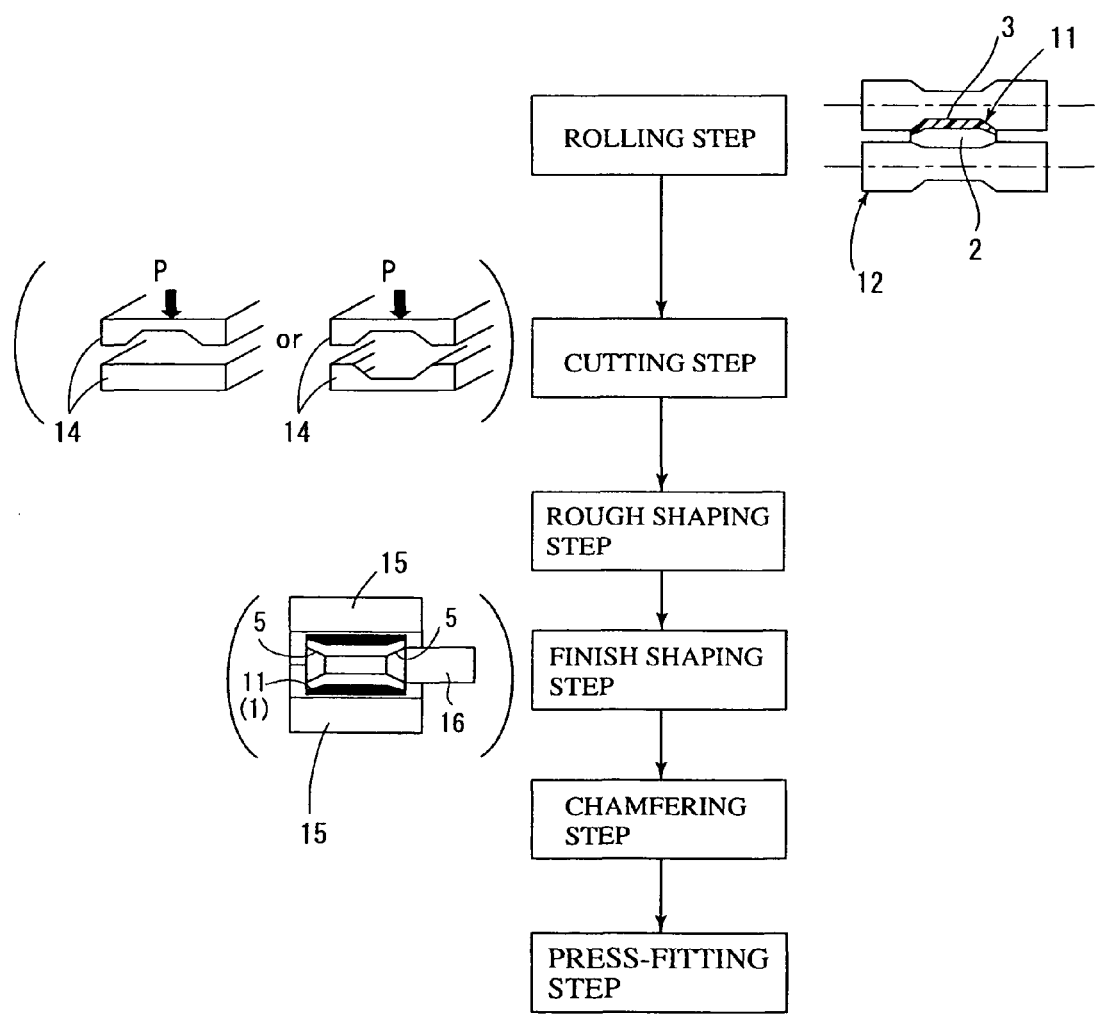
FIG. 4 shows a manufacturing process of the embodiment.

Next, a method of manufacturing the sliding bearing 1 provided as described above will be explained. Referring to FIG. 4, firstly, the plate-shaped material 11 wound like a coil is prepared. The plate-shaped material 11 is drawn out by a predetermined amount and then is vertically rolled by an upper and lower pair of molding rolls 12 (rolling step). Incidentally, the plate-shaped material 11 of the embodiment has a double structure in which the back metal 2 made of a steel such as SPCC is positioned as a lower layer and the lining layer 3 covers its surface (a top face). The lining layer 3 includes a minute granular sintered alloy layer and a resin layer covering the sintered alloy layer (see FIG. 5(a)). In other words, the plate-shaped material 11 has a three-layered structure in which the sintered alloy layer is provided on the surface of the back metal 2 and the resin layer is provided to cover the sintered alloy layer.

Figure 5:
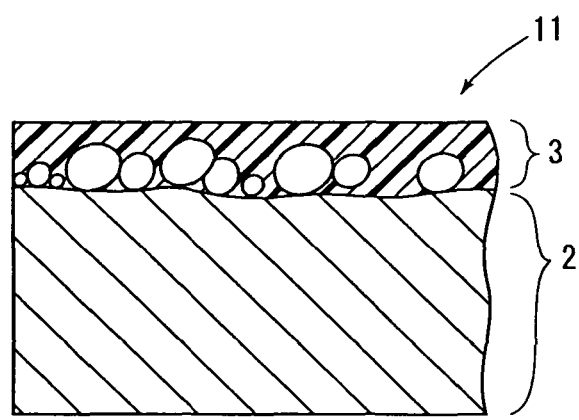
FIG. 5 is a sectional view showing one side of a material 11 before and after a rolling step.
Figure 5:
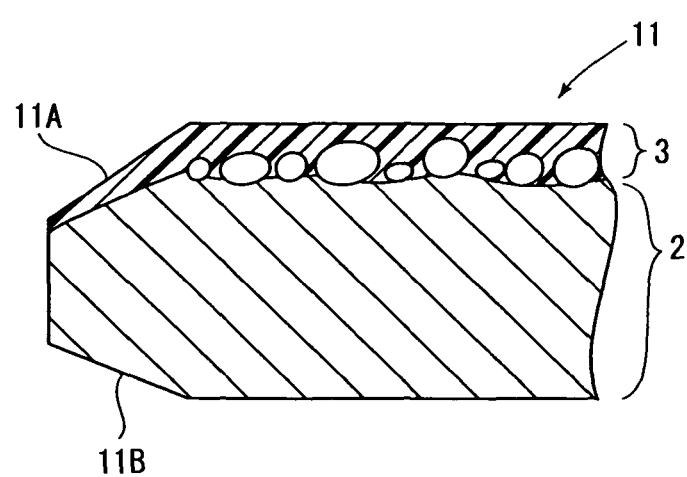

When both sides of the plate-shaped material 11 are vertically rolled by the molding rolls 12, a right and left pair of sloped surfaces 11A serving as the crownings 5 and 5 are formed on both sides of the plate-shaped material 11. The right and left pair of sloped surfaces 11A have both sides which are thinner than the center portion in the width direction (see FIG. 5b). The sloped surfaces 11A are provided on both sides of the plate-shaped material 11 by the molding rolls 12 as described above, and accordingly, a sloped surface to be the first crowning 3A and another sloped surface of the back metal 2 positioned below the sloped surface to be the second crowning 2A are formed. Further, a sloped surface 11B to be a chamfered portion 1D on the outer circumferential edge is simultaneously formed. At this time, as shown in FIG. 5(b), the sintered alloy layer and the resin layer forming the back metal 2 and the lining layer 3 are evenly pressed and evenly crushed on both sides of the material 11 where the sloped surfaces 11A are formed. In short, a pressed amount of each layer is equal to a half of a total crowning amount.

Subsequently, the plate-shaped material 11 that is rolled by the molding rolls 12 is cut to have a predetermined dimension (cutting step). The length of the plate-shaped material 11 after being cut is equal to a circumferential dimension of the sliding bearing 1 after being completely manufactured. Also, the width of the plate-shaped material 11 after being cut is equal to an axial dimension of the sliding bearing 1 after being completely manufactured.

Next, the rectangular material 11 which is cut after being rolled is roughly shaped to be approximately cylindrical by a shaping means so that the right and left pair of sloped surfaces 11A provide inner circumferential parts on both axial ends (rough shaping step). Then, the approximately cylindrical material 11 is finished to be exactly cylindrical by a finish shaping means (finish shaping step).

Thus, the sliding bearing 1 having the crownings 5 and 5 on both sides of the inner circumferential surface is formed. Subsequently, the chamfered portion 1C is formed by a chamfering means on the inner circumferential edge at the boundary between the crownings 5 and 5 and the end surfaces 1A and 1B in the sliding bearing 1 (chamfering step). As described above, the crownings 5 and 5 are provided by the first crowning 3A of the lining layer 3 and the second crowning 2A of the back metal 2. The second crowning 2A is the sloped surface having the end surface 1A (1B) having a diameter increasing from the center portion in the axial direction.

Accordingly, the sliding bearing 1 as shown in FIG. 1 as a single body in cross-section is manufactured. After being manufactured, the sliding bearing 1 is pressed-fitted into a housing for a compressor (not shown). The sliding bearing 1 having the crownings 5 and 5 on both ends of the sliding surface 4 is manufactured by the manufacturing method of the embodiment as described above.

Incidentally, in the manufacturing method of the embodiment as described above, the pair of sloped surfaces 11A to be the crownings 5 and 5 are formed by rolling both sides of the plate-shaped material 11 using the molding rolls 12 before the cutting step. However, the sloped surfaces 11A or the crowning 5 may be formed without using the molding rolls 12 as described below.

First, the plate-shaped material 11 is cut to have a predetermined dimension. During the cutting step, both sides of the material 11 may be vertically pressed by an upper and lower pair of shaping means 14 so as to form sloped surfaces serving as the crownings 5 and 5 (see drawings on the left side of the cutting step in FIG. 4). At this time, as shown in a perspective view on the left side, an upper surface of the shaping means 14 on the lower side may have a plate-like shape and the sloped surface 11A may be formed only on the upper surface of the material 11. Then, the chamfered portion 1D may be formed during a later step.

Also, as another manufacturing method, in a finish shaping step for shaping the material 11 that is cut to have a predetermined dimension to be exactly cylindrical, the material 11 may be finished to be exactly cylindrical within two-split molds 15 and 15 as shown in FIG. 4. Simultaneously, a core 16 having a distal end of a tapered surface may be fitted to both ends of the inner circumferential surface of the cylindrical material 11 and pulled out so as to form the crownings 5 and 5 on both ends of the inner circumferential surface. Incidentally, a commonly-used conventional sizing die may be used instead of the two-split molds 15 and 15.

Thus, through the rolling step using the molding rolls 12, the cutting step, or the finish shaping step for forming a cylindrical shape, or through two or three of the steps, the crownings 5 and 5 can be formed on the sliding bearing 1.

As described above, according to the method of manufacturing the sliding bearing 1 of the embodiment, the crownings are not formed by cutting both ends of the sliding surface 4 (the inner circumferential surface) of the sliding bearing 1. The crownings 5 and 5 are formed by rolling or pressing the material 11.

Consequently, the first crowning 3A (the lining layer 3) providing the crownings 5 and 5 is slightly thinner than the center portion in the axial direction, and the second crowning 2A (the back metal 2) overlapped with the first crowning 3A is provided as the sloped surface. Thus, in the sliding bearing 1 manufactured by the manufacturing method of the embodiment, the lining layer 3 where crownings 5 and 5 are provided has an approximately uniform thickness as a whole as compared to a case in which crownings are formed through a cutting process by a conventional method.

Figure 6:
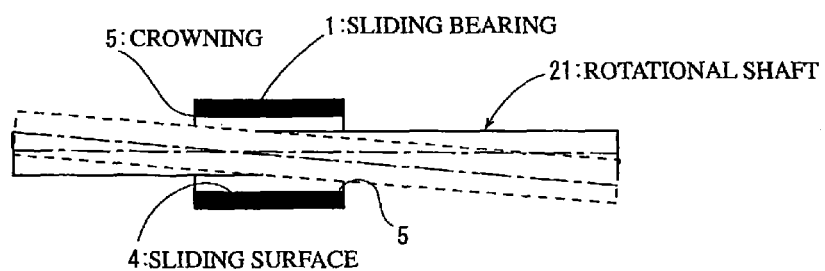
FIG. 6 is a sectional view showing a relationship between a sliding bearing and a rotational shaft.

As shown in FIG. 6, in the sliding bearing 1 of the embodiment, the crownings 5 and 5 are formed on the sliding surface 4 of the sliding bearing 1. The lining layer 3 where the crowning 5 are formed, i.e., the first crowning 3A, has a uniform thickness. Further, the second crowning 2A (the back metal 2) is provided as a sloped surface. Therefore, even when the rotational shaft 21 serving as the partner material is largely inclined, deflected, or swung, the rotational shaft 21 is not strongly brought into contact with both ends of the sliding surface 4 of the sliding bearing 1 (the crownings 5 and 5). In other words, the crownings 5 and 5 are prevented from being brought into nonuniform contact with the rotational shaft 21, and thus the crownings 5 and 5 can be prevented from abnormal wear, seizure, and fatigue.

Also, in the sliding bearing 1 of the embodiment, the lining layer 3 serving as the first crowning 3A can be thicker than a conventional crowning. Accordingly, the elasticity of the crownings 5 and 5 can be enhanced as a whole, and therefore the compatibility for supporting the rotational shaft 21 as the partner material becomes favorable. Consequently, in the embodiment, the sliding bearing 1 having a longer life as compared with a conventional sliding bearing can be provided.

Figure 7:
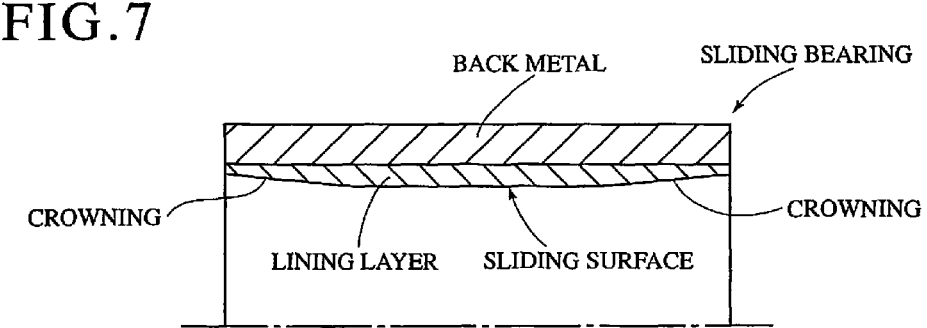
FIG. 7 is a sectional view showing a main part of a conventional sliding bearing.

As compared with the sliding bearing 1 of the embodiment as described above, in a sliding bearing disclosed in Patent Literature 2, the thickness of a back metal has a uniform thickness as a whole in the axial direction as simplistically shown in FIG. 7. In other words, the thickness of the back metal as a lower layer of a crowning is the same as the thickness of a center portion in the axial direction.

In such a conventional sliding bearing, a lining layer is firstly formed to have a uniform thickness on an inner circumferential surface of the back metal and then both ends of an inner circumferential surface of a lining layer are cut to be sloped surfaces so as to form crownings. In the conventional sliding bearing having the crownings formed through such steps, a bearing alloy layer where the crownings are formed becomes gradually thinner toward end surfaces as shown in FIG. 7. Thus, when the rotational shaft is swung, the lining layer where the crownings are formed is brought into nonuniform contact with the rotational shaft and becomes quickly worn, and therefore the back metal may be unfavorably exposed.

Figure 8:
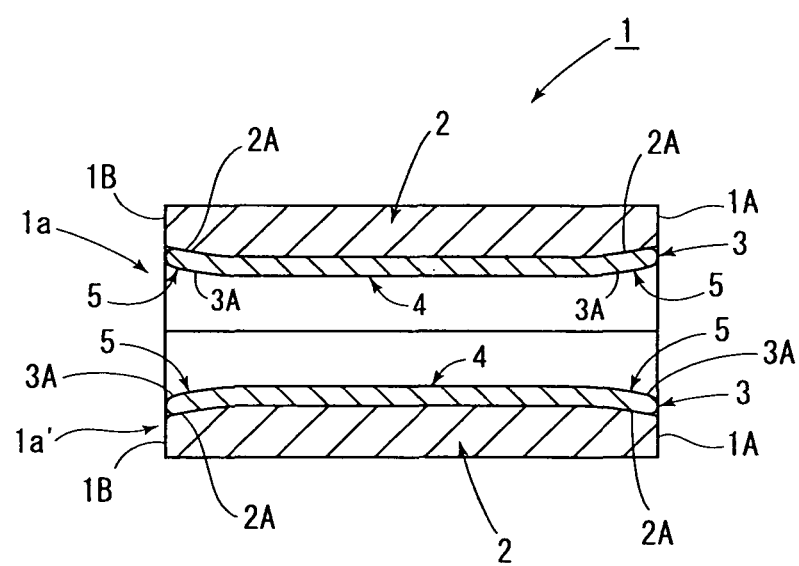
FIG. 8 is a sectional view showing a second embodiment of the present invention.

Next, FIG. 8 shows a second embodiment of the present invention. In the second embodiment, the present invention is applied to a sliding bearing 1 formed to be cylindrical by combining two halved bearings 1a and 1a' that are semicylindrical. As shown in FIG. 8, each of the halved bearings 1a and 1a' forms a semicylindrical member. In the second embodiment, the same components as those in the first embodiment are denoted by the same reference numerals. Even in the second embodiment as shown in FIG. 8, the same advantages can be obtained as in the first embodiment.

Incidentally, in the embodiments as described above, the crownings 5 and 5 are provided by tapered surfaces (sloped surfaces) having a linear shape in cross-section. However, the crownings 5 and 5 may be provided by sloped surfaces having a circular arc shape in cross-section. Also, the crowning 5 may be formed only on one of both ends of the sliding surface 4 of the cylindrical sliding bearing 1 or the halved bearings 1a and 1a'.

Especially, in the second embodiment as shown in FIG. 8, the crownings 5 of the semicylindrical halved bearings 1a and 1a' may be positioned at ends on the same side, or may be positioned at ends on different sides.

REFERENCE SIGNS LIST

1 . . . sliding bearing
1a, 1a' . . . halved bearing
1A, 1B . . . end surface
2 . . . back metal
2A . . . second crowning
3 . . . lining layer
3A . . . first crowning
4 . . . sliding surface
5 . . . crowning
11 . . . plate-shaped material
12 . . . molding roll
14 . . . shaping means
15 . . . mold

The invention claimed is:

1. A sliding bearing including a cylindrical member or obtained by combining two semicylindrical members to be cylindrical, comprising
the cylindrical member or the semicylindrical members including a solid back metal and a lining layer provided to cover an inner circumferential surface of the back metal so that the lining layer serves as a sliding surface and including a crowning formed of a sloped surface having a diameter gradually increasing toward an end surface from a center portion in an axial direction on at least one of both axial ends of the sliding surface,
wherein the crowning includes:
a second crowning formed of a sloped surface whose diameter gradually increases towards an end surface from a center portion in an axial direction on the solid back metal and
a first crowning formed of a sloped surface whose diameter gradually increases towards an end surface from a center portion in an axial direction on a part of the lining layer corresponding to the second crowning.

2. The sliding bearing according to claim 1, wherein an axial dimension of the crowning is set to be 5 to 15% of an axial length of the sliding bearing.

3. The sliding bearing according to claim 1, wherein a maximum dimension of the crowning having a diameter increasing toward an outer side in a radial direction is set to be 5 to 100 μm.

4. The sliding bearing according to claim 1, wherein the surface roughness of the crowning is smaller than that of the sliding surface at the center portion in the axial direction.

5. The sliding bearing according to claim 1, wherein the lining layer includes a sintered alloy layer and a resin layer covering a surface of the sintered alloy layer, or an alloy layer.

6. A method of manufacturing the sliding bearing according to claim 1, comprising:
forming a sloped surface that is gradually thinner from a center portion toward a side portion in a width direction on one of both sides of a plate-shaped material by vertically pressing at least one of the both sides of the plate-shaped material including a solid back metal and a lining layer covering a surface of the back metal using a molding roll;
cutting the plate-shaped material to have a predetermined length; and
shaping the plate-shaped material that is cut to have the predetermined length to be cylindrical or semicylindrical as a whole so that the lining layer serves as an inner circumferential surface and the sloped surface is positioned on one end of the inner circumferential surface in an axial direction.

7. The method of manufacturing the sliding bearing according to claim 6, wherein the lining layer includes a sintered alloy layer and a resin layer covering a surface of the sintered alloy layer, or an alloy layer.

8. A method of manufacturing the sliding bearing according to claim 1, comprising:
forming a sloped surface that is gradually thinner from a center portion toward a side in a width direction by cutting a plate-shaped material including a solid back metal and a lining layer covering a surface of the back metal to have a predetermined length and pressing at least one of both sides of the material using a mold; and
shaping the plate-shaped material that is cut to have the predetermined length to be cylindrical or semicylindrical as a whole so that the lining layer serves as an inner circumferential surface and the sloped surface is positioned on one end of the inner circumferential surface in an axial direction.

9. A method of manufacturing the sliding bearing according to claim 1, comprising:
cutting a plate-shaped material including a solid back metal and a lining layer covering a surface of the back metal to have a predetermined length; and
shaping the plate-shaped material that is cut to have the predetermined length to be cylindrical or semicylindrical as a whole so that the lining layer serves as an inner circumferential surface and forming a sloped surface having a diameter increasing from a center portion toward an end surface in an axial direction on at least one of both ends of the inner circumferential surface in the axial direction.

10. A method of manufacturing a sliding bearing including a cylindrical member or two semicylindrical members combined to be cylindrical, the cylindrical member or the semicylindrical members including a solid back metal and a lining layer provided to cover an inner circumferential surface of the back metal so that the lining layer serves as a sliding surface, the lining layer including a crowning formed of a sloped surface having a diameter gradually increasing towards an end surface from a center portion in an axial direction on at least one of both axial ends of the sliding surface, the crowning including a first crowning formed of a sloped surface on the lining layer and a second crowning formed on a sloped surface on a part of the back metal which corresponds to the first crowning, said method comprising the steps of:
cutting a plate-shaped material including a solid back metal and a lining layer covering a surface of the back metal to have a predetermined length; and
shaping the plate-shaped material that is cut to have the predetermined length to be cylindrical or semicylindrical as a whole so that the lining layer serves as an inner circumferential surface and forming a sloped surface having a diameter increasing from a center portion toward an end surface in an axial direction on at least one of both ends of the inner circumferential surface in the axial direction.

* * * * *